(12) United States Patent
Tojo

(10) Patent No.: US 7,982,792 B2
(45) Date of Patent: Jul. 19, 2011

(54) IMAGE PROCESSING APPARATUS

(75) Inventor: Hiroshi Tojo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1713 days.

(21) Appl. No.: 10/351,347

(22) Filed: Jan. 27, 2003

(65) Prior Publication Data

US 2003/0151688 A1    Aug. 14, 2003

(30) Foreign Application Priority Data

Feb. 8, 2002  (JP) ................................. 2002-032361
Dec. 25, 2002  (JP) ................................. 2002-374524

(51) Int. Cl.
 *H04N 5/222* (2006.01)
(52) U.S. Cl. ........... 348/333.02; 348/208.15; 348/231.2; 348/207.2; 348/346
(58) Field of Classification Search ............... 348/207.1, 348/208.15, 231.2, 333.02, 345–356
See application file for complete search history.

(56) References Cited

U.S. PATENT DOCUMENTS

| | | | | |
|---|---|---|---|---|
| 4,463,384 A | * | 7/1984 | Fujikawa et al. | 348/346 |
| 5,369,461 A | * | 11/1994 | Hirasawa et al. | 396/135 |
| 5,581,362 A | * | 12/1996 | Sakaue et al. | 386/95 |
| 7,053,953 B2 | * | 5/2006 | Belz et al. | 348/346 |
| 7,106,366 B2 | * | 9/2006 | Parker et al. | 348/222.1 |
| 2002/0197060 A1 | * | 12/2002 | Itoh et al. | 386/69 |

FOREIGN PATENT DOCUMENTS

| | | |
|---|---|---|
| JP | 6-86143 | 3/1994 |
| JP | 7-99605 | 4/1995 |
| JP | 11-262096 | 9/1999 |
| JP | 2000-156785 | 6/2000 |
| JP | 2000-224525 | 8/2000 |
| JP | 2001-8135 | 1/2001 |

OTHER PUBLICATIONS relevant URLs: http://www.mathtools.net/Java/Image_Processing/index.html; http://rsb.info.nih.gov/ij/ip-demo1/; http://rsb.info.nih.gov/ij/ip-demo2/.*
Japanese Office Action and its partial English translation, dated Aug. 21, 2007, regarding Application No. 2002-374524.

* cited by examiner

*Primary Examiner* — Sinh Tran
*Assistant Examiner* — Anthony J Daniels
(74) *Attorney, Agent, or Firm* — Fitzpatrick, Cella, Harper & Scinto

(57) ABSTRACT

Provided is an image processing apparatus that judges an in-focus degree of a motion picture related to a motion picture signal based on control information inputted along with the motion picture signal and related to an operation of photographing the motion picture signal. The image processing apparatus then changes a form in which an image related to the motion picture signal is displayed or printed, in accordance with a result of the judgment.

8 Claims, 17 Drawing Sheets

FIG. 5

| BIT | FIELD NAME | DESCRIPTION |
|---|---|---|
| 3-2 | FOCUSING DIRECTION | MOVING DIRECTION OF FOCUS LENS<br><br>· INFINITY = 00b<br>· NEAR = 01b |
| 1-0 | FOCUSING SPEED | INDICATING FOCUS LENS SPEED WITH FOLLOWING THREE STEPS<br><br>· STEP-1 (LOW) = 01b<br>· STEP-2 (MIDDLE) = 10b<br>· STEP-3 (HIGH) = 11b<br><br>NOTE THAT WHEN FOCUS LENS IS STOPPED,<br><br>· STEP-0 (STOP) = 00b |

FIG. 11

| BIT | FIELD NAME | DESCRIPTION |
|---|---|---|
| 7-0 | FOCUS POSITION | DESCRIBING FOCUS LENS POSITION WITH PERCENTAGE OF MOVABLE RANGE THEREOF. NOTE THAT IN CASE OF PHOTOGRAPHING OF OBJECT AT INFINITE POSITION, DESCRIBING FOCUS LENS POSITION WITH 0%. |

| BIT | FIELD NAME | DESCRIPTION |
|---|---|---|
| 0 | FOCUS | 0b: IN-FOCUS<br>1b: DEFOCUS |

IMAGE PROCESSING APPARATUS

BACKGROUND OF THE INVENTION

1. Field of the Invention

The present invention relates to an image processing apparatus, and more particularly to processing that uses information at the time of photographing of an image signal.

2. Related Background Art

As can be seen in Japanese Patent Application Laid-open No. 07-99605 (U.S. Pat. No. 5,581,362) and the like, there has conventionally been proposed a construction where information detected by a sensor provided for an image pickup apparatus or information showing settings made by a user is recorded along with a motion picture, thereby making it possible to retrieve, reproduce, and print an image based on the information.

In Japanese Patent Application Laid-open No. 07-99605, for instance, an in-focus distance is described as sensor information and, after this distance changes for a predetermined period of time, it becomes possible to extract a frame after the changing for the predetermined period of time as a frame for retrieval.

At the time of photographing of a motion picture, photographing environments, such as a distance to a subject, change at all times. Even if there is made an attempt to control an image pickup apparatus to follow this changing of the photographing environments, photographing needs to be performed even midway through the control because it is required that around 30 frames or around 60 fields are photographed per second in the case of NTSC. In particular, in the case where a subject moves from a near position to a far position under a state where photographing is performed by setting a zoom lens on a tele side, it is required to rapidly move a focus lens because a depth of field is shallow, which results in a situation where there exist frames in which blurring occurs.

Under such a circumstance, however, with the method described in Japanese Patent Application Laid-open No. 07-99605, for instance, it is required to observe changing for the predetermined period of time, so that it is impossible to make a judgment on image shaking for every frame.

Also, it is possible to easily judge if blurring occurs based on whether the focus lens is rapidly moved. With conventional techniques, however, it has been impossible to describe information on control of the focus lens.

SUMMARY OF THE INVENTION

An object of the present invention is to solve the problems described above.

Another object of the present invention is to judge the occurrence of blurring of image data based on information regarding control of a focus lens, thereby allowing a user to avoid the usage of frames in which blurring occurs, at the time of printing or editing.

In order to attain the above-mentioned object, according to one aspect of the present invention, there is provided an image processing apparatus including:

an input unit which inputs a motion picture signal and control information related to an operation of photographing the motion picture signal;

a judging unit which judges an in-focus degree of a motion picture related to the motion picture signal based on the control information inputted from the input unit;

an output unit which outputs an image related to the motion picture signal inputted from the input unit; and a control unit which controls the output unit to change a form in which the image is outputted, in accordance with a result of the judgment by the judging unit.

Other objects and features of the present invention will become apparent from the following embodiments of the present invention to be described with reference to the accompanying drawings.

BRIEF DESCRIPTION OF THE DRAWINGS

FIG. 5 shows the focus information;

FIG. 11 shows the focus information;

DETAILED DESCRIPTION OF THE PREFERRED EMBODIMENTS

Hereinafter, embodiments of the present invention will be described.

Figure 1:
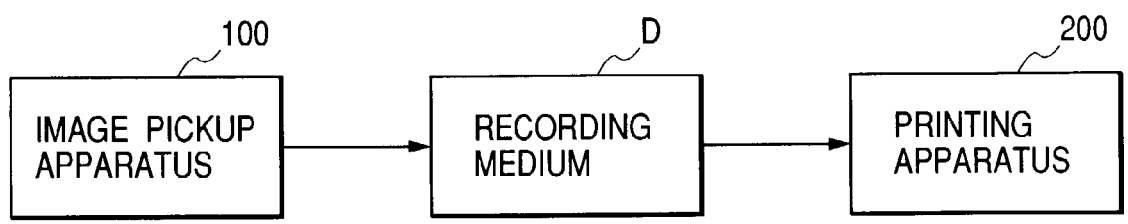
FIG. 1 shows the construction of a system to which the present invention is applied.

The present invention is applied to a system shown in FIG. 1, for instance. In FIG. 1, reference numeral 100 denotes an image pickup apparatus that picks up a motion picture and reference symbol "D" represents a recording medium (disk medium in this embodiment) in which the motion picture and the like are stored. Also, reference numeral 200 indicates a printing apparatus that extracts a specific frame image in the motion picture stored in the disk D and prints the extracted frame image.

First, the image pickup apparatus 100 will be described.

Figure 2:
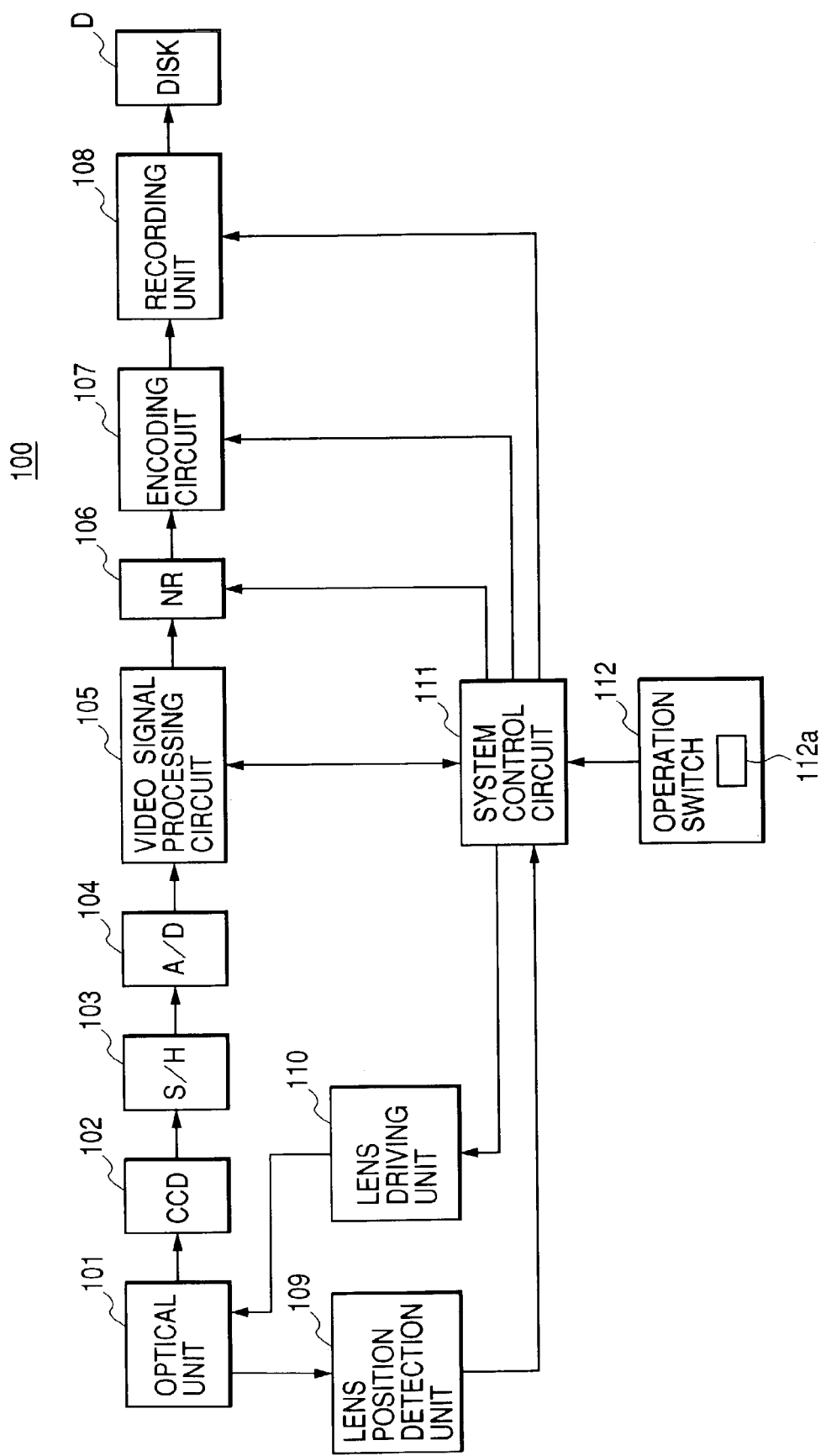
FIG. 2 shows the construction of an image pickup apparatus that is an embodiment of the present invention.

FIG. 2 is a block diagram showing the construction of the image pickup apparatus 100. In FIG. 2, reference numeral 101 denotes an optical unit that includes a focus lens for adjusting a subject distance, a zoom lens for adjusting a focal distance, and an iris. Reference numeral 102 represents an image pickup element constructed from a CCD that converts inputted light into an electric signal. Reference numeral 103 indicates a sample/hold AGC circuit that performs sample-holding and gain adjustment.

Reference numeral 104 denotes an A/D converter and numeral 105 represents a video signal processing circuit that processes a digital image signal from the A/D converter 104, thereby converting the signal into a form suited for recording. Reference numeral 106 indicates a noise reduction circuit (NR) that includes a field memory and removes noise in a video signal. This NR 18 is constructed from a cyclic noise reduction circuit.

Reference numeral 107 denotes an encoding circuit that encodes image data in accordance with an encoding format such as an MPEG format. Reference numeral 108 indicates a recording unit that is constructed from a drive for driving the disk D to thereby record information and the like. The reference symbol "D" denotes the recording medium. A disk-shaped recording medium, such as an optical disk, a magnetic disk, a magneto-optical disk, or a hard disk, is used in this embodiment. Needless to say, however, it is possible to use a recording medium other than these media.

Reference numeral 109 denotes a lens position detection unit that detects the position of a lens and reference numeral 110 indicates a lens driving unit that drives the lens. Reference numeral 111 represents a system control circuit that takes the overall control of the image pickup apparatus.

Figure 3:
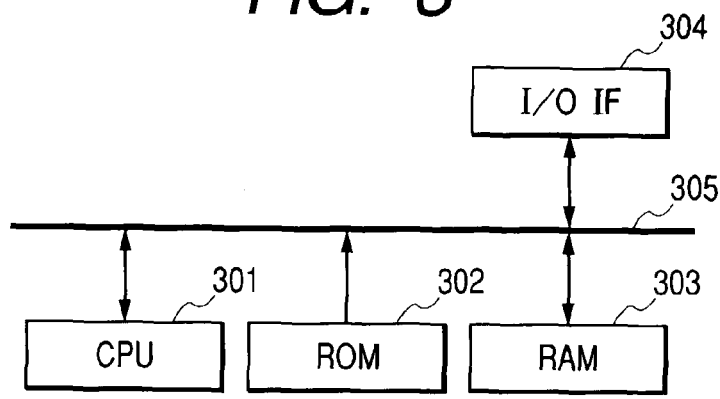
FIG. 3 shows the construction of a system control circuit in FIG. 2.

FIG. 3 is a block diagram showing the construction of the system control circuit 111. This system control circuit 111 includes publicly known components that are a CPU 301, a ROM 302, a RAM 303, an I/O interface 304, and a bus 305. In the ROM 302, there are stored a program (to be described later) that is executed by the CPU 301, table values, and the like.

Reference numeral 112 denotes an operation switch that includes a zoom key 112a for changing a zooming factor, in addition to a recording trigger key and a battery key, in this embodiment. The zoom key 112a is a key for changing the zooming factor in a wide (wide-angle=image reduction) direction and a tele (telephoto=image enlargement) direction and is, for instance, a seesaw-type interlocked key. Also, the zoom key 112a outputs, to the system control circuit 111, an output signal that shows which one of the wide key and telephoto key is depressed and also shows a push pressure at which the key is depressed.

An object light received by the optical unit 101 is imaged on a surface of the image pickup element 102. Then, after the object light is converted into an electric signal by the image pickup element 102, the electric signal is A/D-converted by the A/D converter 104 through the S/H 103 and is outputted to the video signal processing circuit 105.

The video signal processing circuit 105 subjects each of brightness and color components of the inputted image signal to processing such as an aperture correction, a gamma correction, and a white balance correction. The video signal processing circuit 105 then outputs the processed image signal to the NR 106. The NR 106 is controlled by a control signal from the system control circuit 111 and removes noise in the video signal. The video signal, from which the noise has been removed, is outputted to the encoding circuit 107.

The encoding circuit 107 encodes the inputted video signal. Upon the input of the video signal, the encoding circuit 107 adds information on control of the focus lens (hereinafter referred to as the "focus information", to be described later) inputted from the system control circuit 111 to the encoded video signal and outputs the information to the recording unit 108. Note that processing of the focus information will be described later.

When the zoom key 112a of the operation switch 112 is operated, the system control circuit 111 moves the optical unit in the wide direction or the tele direction by controlling the lens driving unit 110. In addition, the system control circuit 111 moves a zooming factor in the wide direction or the tele direction by controlling an electronic zoom function of the video signal processing circuit 105.

Also, with reference to a lens position detection signal from the lens position detection unit 109, the system control circuit 111 judges whether a current position of the zoom lens of the optical unit 101 (that is, the system control circuit 111 detects a current zooming factor) is a tele end (most telephoto end point), a wide end (most wide-angle end point), or a position between the tele end and the wide end.

The system control circuit 111 also changes the effectiveness of NR, which is to say the removal amount of noise, by switching a control value of the noise reduction between a stoppage time and an operation time of the optical zoom and outputting a control signal to the NR 106. During this operation, the control value to be switched is a cyclic coefficient K.

The switching of the control value is also performed depending on the brightness of the subject. As the brightness of the subject is reduced, the S/N of a video signal is degraded, so that the control value is switched in order to increase the effectiveness of the noise reduction, thereby complementing the degradation of the S/N.

The system control circuit 111 controls the iris of the optical unit 101, the gain of the S/H 103, an unillustrated electronic shutter function, and the like in order to keep the level of a video signal to be generated at a predetermined value with reference to the amount of a light signal from the object. The system control circuit 111 also comprehensively judges the brightness of the object with reference to these aperture value, AGC gain, electronic shutter speed, and the like that are applied to exposure control.

Figure 4:
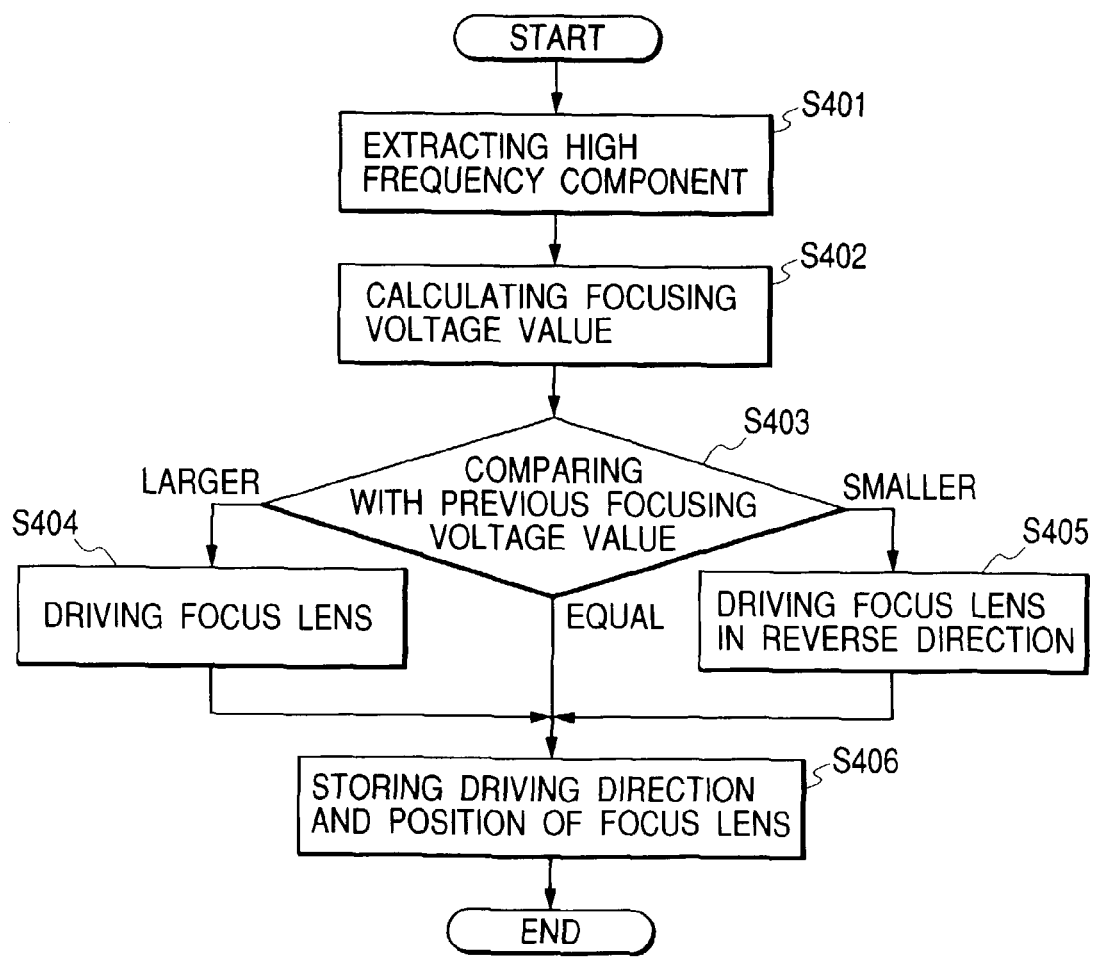
FIG. 4 is a flowchart showing an operation for detecting focus information.

Next, a procedure of processing performed by the system control circuit 111 to control the focus lens will be described with reference to a flowchart shown in FIG. 4.

The image pickup apparatus 100 performs automatic focus adjustment. In this embodiment, the image pickup apparatus 100 also adds focus information showing the driving direction and driving degree (focusing speed) of the focus lens at that time to image data and records them. The method of performing the automatic focus adjustment is not specifically limited. For instance, it is possible to use a so-called hill-climbing system in which focusing is performed by extracting a high frequency component in a video signal obtained from an image pickup element, such as a CCD, and driving the focus lens so that this high frequency component is maximized.

In this embodiment, a description will be made with reference to the flowchart in FIG. 4 by assuming that the automatic focus adjustment is performed based on this method. Note that a series of processing shown in the flowchart in FIG. 4 is carried out by the system control circuit 111 once per frame or field.

First, the video signal processing circuit 105 extracts a high frequency component in a video signal using a band-pass filter (BPF) or the like (step S401). Next, only the video signal corresponding to an in-focus detection region set in a part of a screen is extracted using a gate circuit or the like, peak holding is performed at intervals in synchronism with an integer multiple of a vertical synchronizing signal using a peak hold circuit or the like, and this peak-held value is stored in an internal memory as a focusing voltage value (step S402).

Next, this focusing voltage value is compared with a previously detected focusing voltage value (step S403). If the value detected this time is larger than the previous value, the processing proceeds to step S404, in which the focus lens is driven by controlling the lens driving unit 110 in accordance with the magnitude thereof. As the difference between the currently detected value and the previous value is increased, the in-focus degree becomes smaller and therefore the degree of blurring becomes larger. Therefore, in order to attain an in-focus condition speedily, the focus lens is driven by controlling the lens driving unit 110 using an output from the lens position detection unit 109. During this operation, the focus lens is moved at high speed in the case of a large degree of blurring and is moved slowly in the case of a small degree of blurring.

It should be noted here that in an image pickup apparatus for motion pictures like the image pickup apparatus in this embodiment, it is required that processing is finished for every field or every frame, so that even the longest driving time period becomes 1/60 second or 1/30 second in the case of NTSC (in reality, this time period is further shortened because other processing is also included). Also, if the value detected this time is smaller than the previous value in S403, the processing proceeds to step S405, in which the focus lens is driven in the same manner as in step S404. In this case, however, the focus lens is driven in a reverse direction (that is, if the focus lens is driven in an infinite direction in step S404, the focus lens is driven in a near direction in step S405).

Also, if the value detected this time is equal to the previous value, the focus lens is not driven and the processing proceeds to step S406. In general, in the case where the zoom lens exists on the wide side, a depth of field is deep, so that it is hardly required to move the focus lens. However, since the depth of field is shallow on the tele side, in the case where a far object is photographed on the tele side, for instance, it is required to rapidly move the lens. Also, during this rapid movement, it is supposed that a possibility that an in-focus condition is attained is extremely low.

Also, if no previous value exists in step S403, the processing exceptionally proceeds to step S404 and the focus lens is driven by a predetermined amount. Also, in the case where the focus lens position information obtained from the lens position detection unit 109 shows a lens end as a result of the driving of the focus lens in step S404 or S405, the focus lens is driven in a reverse direction by the next drive operation.

Then, in step S406, information showing the driving direction and speed of the focus lens is sent to the encoding circuit 107 as the focus information and is stored with a method described below.

Next, processing of adding the focus information to a motion picture signal and recording them will be described.

As a method of adding control information to a motion picture signal, it is possible to use a method with which the control information is stored in an unused area included in management information of image data in each frame. In more detail, in the case of an MPEG2 stream, for instance, it is possible to use a method with which the control information is stored in a user area of a picture header.

Next, there will be described a format at the time of recording of the focus information. FIG. 5 shows an example of the format. In this embodiment, information showing the moving speed and direction of the focus lens is recorded as the focus information. As shown in FIG. 5, the focus information is constructed from fields named "FOCUSING DIRECTION" and "FOCUSING SPEED". The FOCUSING DIRECTION field gives information describing the moving direction of the focus lens, while the FOCUSING SPEED field gives information indicating the focus lens speed with three steps. Note that when the focus lens is stopped, this state is indicated as STEP-0.

In this embodiment, the focus information shown in FIG. 5 is added to each frame encoded by the encoding circuit 107 and is recorded onto the disk D by the recording unit 108.

Next, there will be described the printing apparatus 200.

Figure 6:
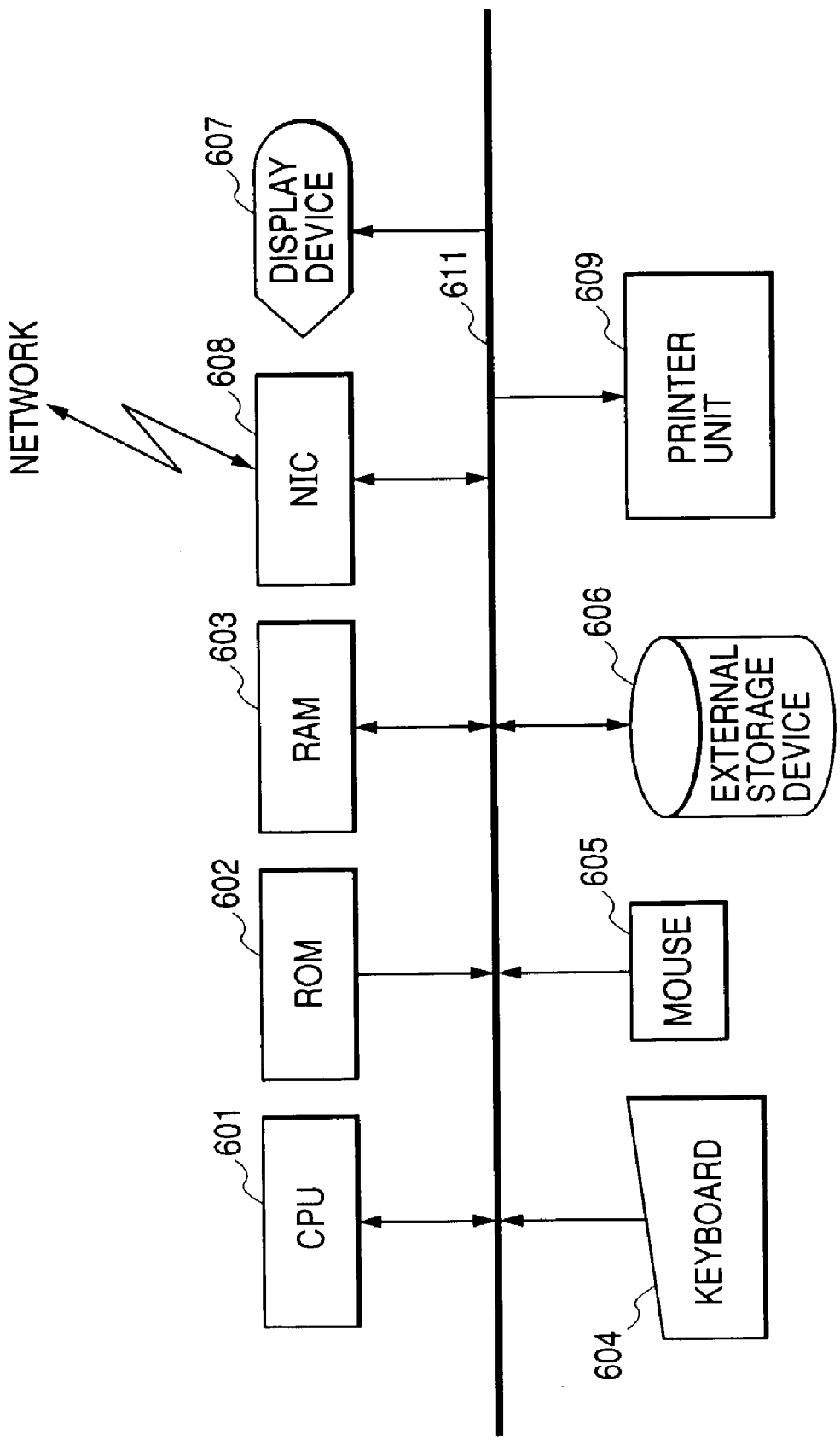
FIG. 6 is a block diagram showing the construction of a printing apparatus in the embodiment of the present invention.

FIG. 6 is a block diagram showing the control construction of the printing apparatus 200. In this drawing, reference numeral 601 denotes a CPU that carries out various kinds of control of the printing apparatus 200. Reference numeral 602 represents a ROM in which there are stored a boot program to be executed at the time of boot-up of the printing apparatus 200 and various kinds of data. Reference numeral 603 indicates a RAM in which there is stored a control program executed by the CPU 601 to perform processing and which provides a work area at the time of carrying-out of various kinds of control by the CPU 601. Reference numerals 604 and 605 respectively denote a keyboard and a mouse that provide a user with an environment for making various input operations.

Reference numeral 606 denotes an external storage device that is constructed from a hard disk, a floppy disk, an optical disk, a magnetic disk, a magneto-optical disk, a magnetic tape, or the like. Reference numeral 607 represents a display device that is constructed from a display and the like and displays a result and the like for the user. Reference numeral 608 indicates a network interface that enables communication with each device on a network. Reference numeral 609 denotes a printer unit that is constructed from a printer and the like.

Figure 7:
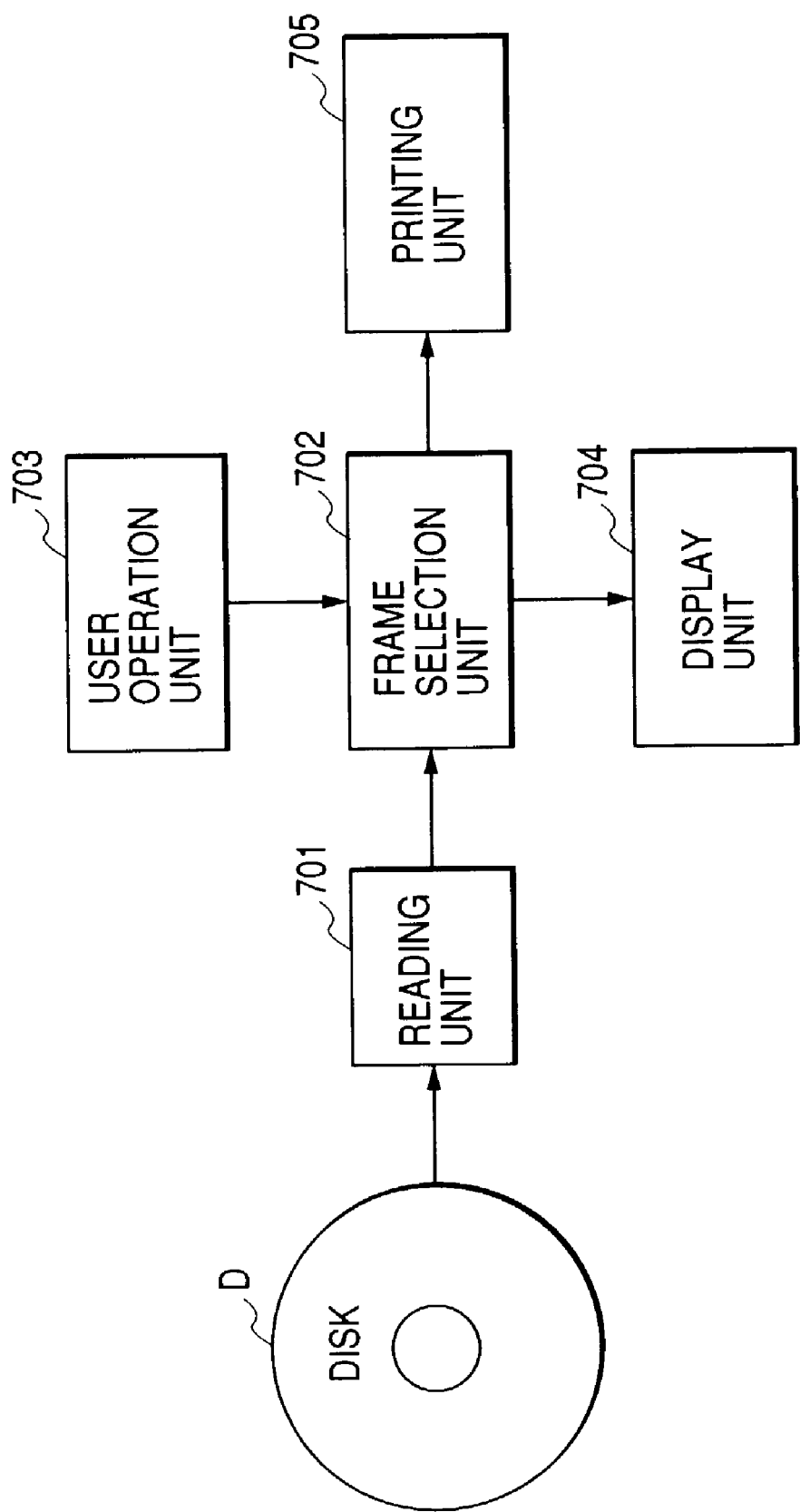
FIG. 7 shows the functional construction of the printing apparatus in the first and second embodiments.

FIG. 7 is a block diagram showing the functional construction of the printing apparatus 200.

In FIG. 7, reference numeral 701 denotes a reading unit that reads a motion picture signal recorded on the disk D in the manner described above and the focus information added to this motion picture signal. Reference numeral 702 represents a frame selection unit that determines each frame of the motion picture to be applied to printing. Reference numeral 703 indicates a user operation unit that is constructed from the keyboard 604 and the mouse 605 and gives a frame selection designation and other designations. Reference numeral 704 denotes a display unit that displays a frame that is a candidate for printing and the like. Reference numeral 705 represents a printing unit that is constructed from the printing unit 609 and the like and prints an image of each frame selected by the frame selection unit 702.

Figure 8:
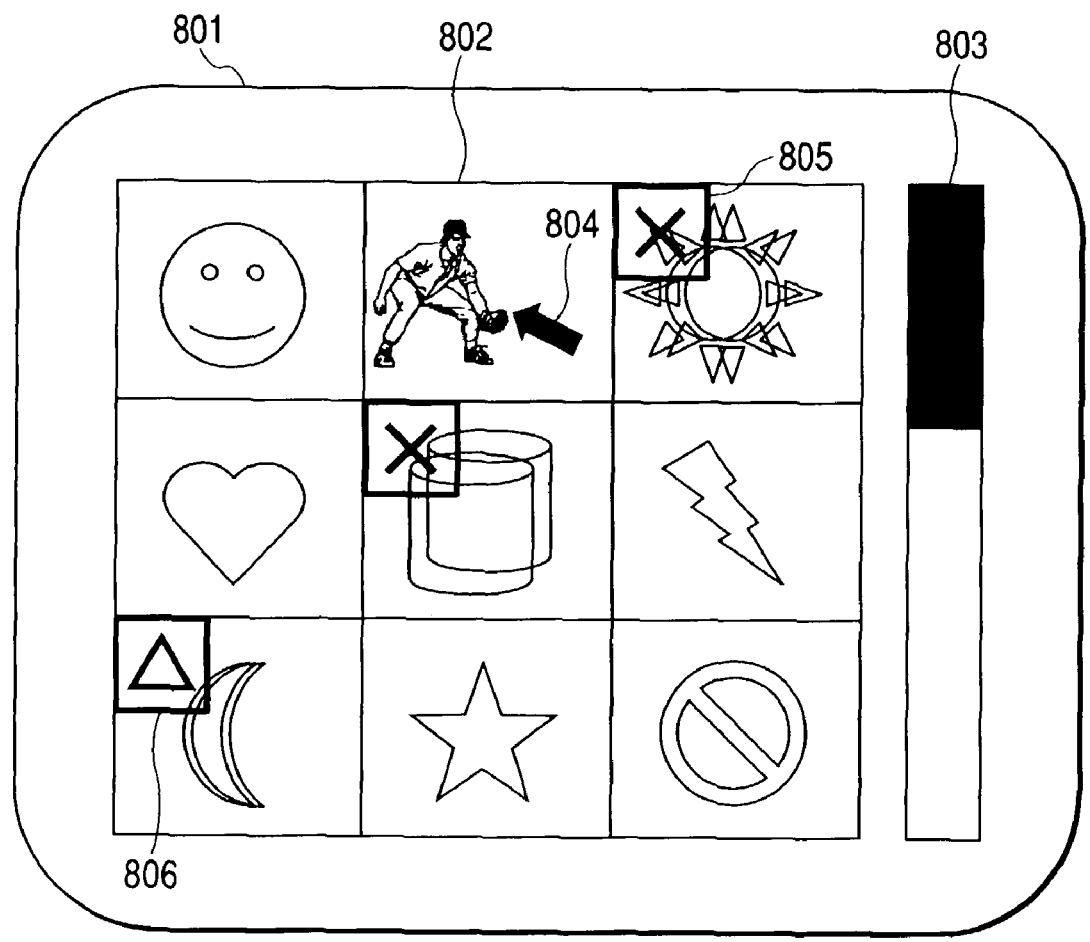
FIG. 8 shows a screen in which thumbnails are displayed.

FIG. 8 shows an example of a user interface that uses a display screen of the display unit 704.

In FIG. 8, reference numeral 801 denotes a display area, while reference numeral 802 represents a thumbnail display area. The frame selection unit 702 reduces the selected frame images of the reproduced image signal and displays the reduced images as thumbnail images by arranging them in chronological order from the upper-left corner in a direction from the left to the right and a direction from the top to the bottom. Reference numeral 803 indicates a scroll bar that is operated to browse the thumbnails in succession in the case where it is impossible to display all thumbnails in the display area 801 at a time. Reference numeral 804 denotes a pointer that is moved by the user through the user operation unit 703 in order to give various instructions.

Figure 9:
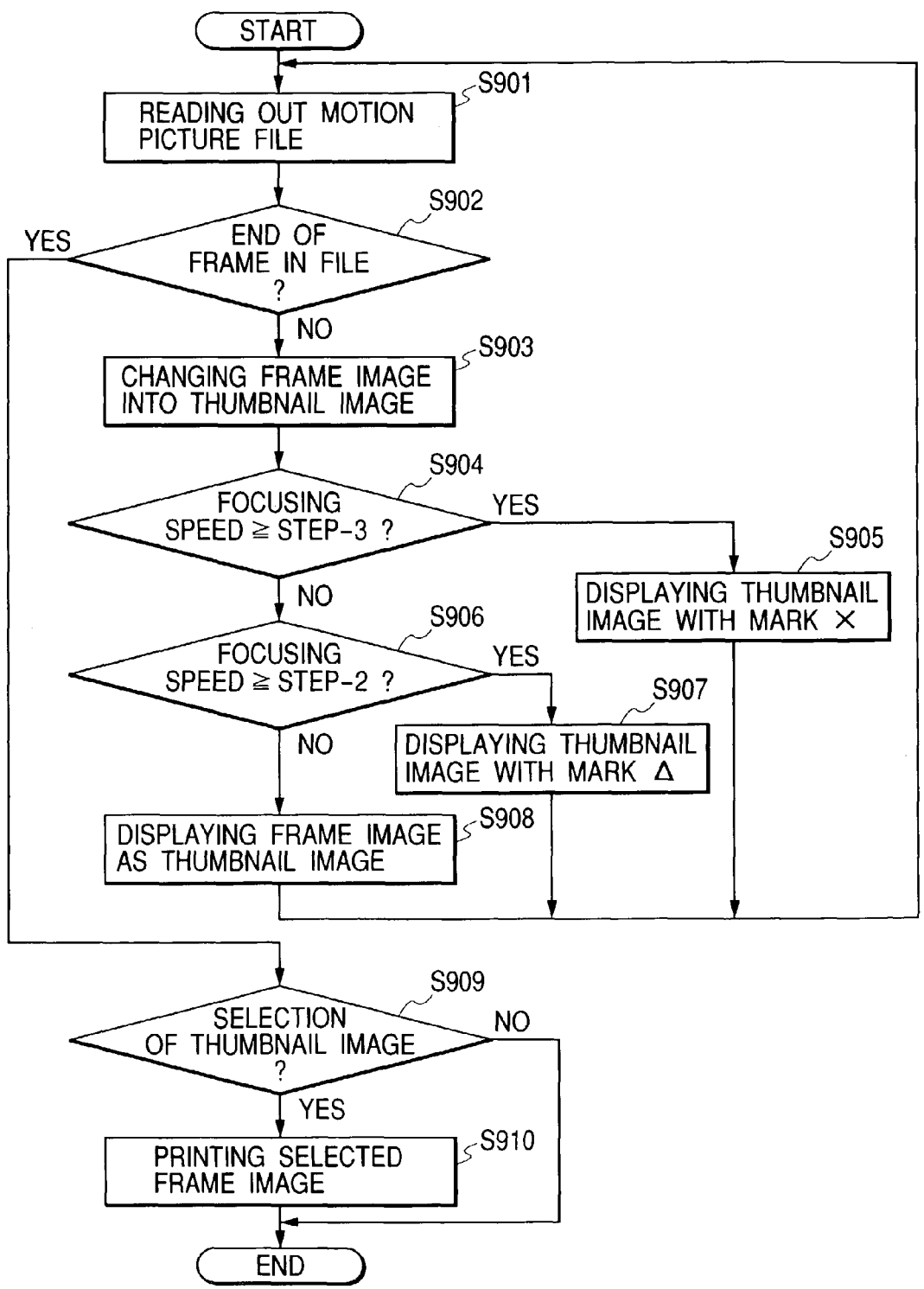
FIG. 9 is a flowchart showing an example of the operation of the printing apparatus in the first embodiment.

FIG. 9 is a flowchart showing an example of the operation of the printing apparatus 200.

First, the reading unit 701 reproduces motion picture data designated by the user through the user operation unit 703 from the disk D and outputs the data to the frame selection unit 702 (step S901). Next, the frame selection unit 702 successively decodes respective frames of the reproduced motion picture data and displays them as thumbnail images on the display unit 704 (steps S902 to S908).

In step S902, it is judged whether all frames in the motion picture data have been processed, with steps S903 to S906 being repeated for every frame in one motion picture file. In step S903, as shown in FIG. 8, the image in each frame is reduced to a size that is suited for displaying side by side on the screen, thereby obtaining thumbnail images. Next, the focusing speed in the focus information added to the image data in each reproduced frame is checked.

It is first judged whether the focusing speed is more than STEP-3 (step S904) and, if a result of this judgment is affirmative, it is judged that a corresponding image is greatly blurred and is not suited for printing. Therefore, in order to call user's attention, a character 805 showing a mark "x" is superimposed and displayed on a corresponding thumbnail image, as shown in FIG. 8 (step S905).

Next, it is judged whether the focusing speed is more than STEP-2 (step S906) and, if a result of this judgment is affirmative, the degree of blurring of the corresponding image is small and it is judged that this image is relatively unsuited for printing. Therefore, in order to call user's attention, a character 806 showing that the image data is relatively unsuited for printing is displayed along with the corresponding thumbnail image, as shown in FIG. 8 (step S907).

In the case where the results of the judgments in steps S904 and S906 are both negative, only the corresponding thumbnail is displayed as it is (step S908).

Also, even if the focusing speed corresponds to STEP-1, there is a possibility that there exists slight blurring. However, at the time of photographing of a motion picture, various conditions, such as a subject distance, change from moment to moment even if the changing degree is small. Therefore, in this case, the corresponding image is dealt as an image for which an in-focus condition is attained (needless to say, even in this case where the focus lens moves at a speed corresponding to STEP-1, the focusing speed may be described as STEP-0).

Thumbnail images are displayed in succession by repeating the processing described above. In the case where the number of thumbnail images exceeds the number of images that can be displayed on the same screen, the thumbnails exceeding the displayable number are held in the internal memory of the frame selection unit 702 and, when the scroll bar 803 is operated, corresponding thumbnails are displayed. After the thumbnail images are displayed, it is judged whether or not the user selects a thumbnail image to be printed using the pointer 804 (S909). If a result of this judgment is affirmative, an image signal in one frame corresponding to the selected thumbnail image is outputted to the printing unit 705 to perform printing of the selected frame image (step S910).

As has been described above, in accordance with this embodiment, the blurring of an image and the degree of the blurring are detected based on the focus information added to each frame of the reproduced motion picture signal. Then, a character showing a result of the detection is superimposed and displayed on the thumbnail image of a corresponding frame. As a result, it becomes possible to use the character as a guideline at the time of user's selection of an image. Also, in ordinary cases, the thumbnail images are images obtained by greatly reducing original images, so that it is difficult to judge whether the images are blurred or not. Even in this case, however, the present invention makes it possible for the user to determine the blurring state of the images without difficulty.

Next, there will be described a second embodiment of the present invention.

The construction of an image processing system in this embodiment is the same as that in the first embodiment shown in FIG. 1 and the construction of the image pickup apparatus 100 is also the same as that shown in FIG. 2, so that the description thereof is omitted in this embodiment.

It should be noted here that in this embodiment, as the focus information, information showing the position of the focus lens is recorded in place of the control information showing the moving speed and direction of the focus lens.

Figure 10:
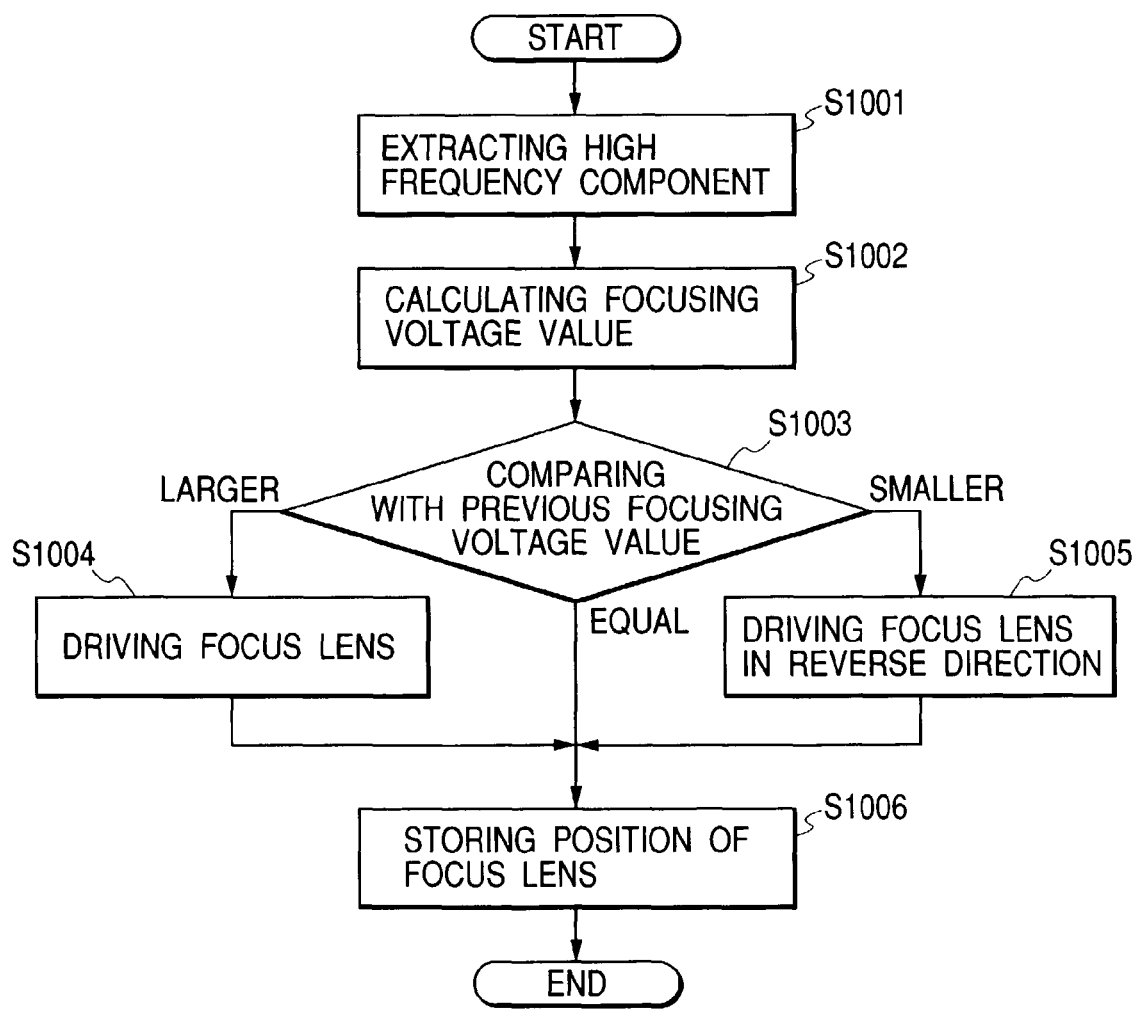
FIG. 10 is a flowchart showing an operation for detecting focus information.

A procedure of processing performed by the system control circuit 111 to control the focus lens in this embodiment will be described with reference to a flowchart shown in FIG. 10. In steps S1001 to S1005, there is performed the same processing as in steps S401 to S405 in FIG. 4 and therefore the description thereof is omitted in this embodiment.

In step S1006, the system control circuit 111 outputs information showing the position of the focus lens outputted from the lens position detection unit 109 to the encoding circuit 107 as the focus information, and the encoding circuit 107 adds this focus information to a motion picture signal and outputs them to the recording unit 108.

Next, there will be described a format at the time of recording of the focus information. An example thereof is shown in FIG. 11. The focus information in this embodiment is constructed from a field named "FOCUS POSITION". This FOCUS POSITION field gives information that describes the position of the focus lens with percentage of the movable range thereof. Note that the position of the focus lens at the time of photographing of an object at an infinite position is described with "0%".

The encoding circuit 107 adds this focus information to each frame of the encoded motion picture data and outputs them to the recording unit 108. The recording unit 108 records the motion picture signal, to which the focus information has been added, onto the disk D.

Next, there will be described how the printing apparatus 200 that processes the motion picture signal, to which the focus information has been added in this manner, operates.

It should be noted here that the control construction and functional construction of the printing apparatus 200 are the same as those in FIGS. 6 and 7 and therefore the description thereof is omitted in this embodiment. Also, the user interface using the display unit 704 is the same as that in the first embodiment and therefore the description thereof is omitted in this embodiment.

Figure 12:
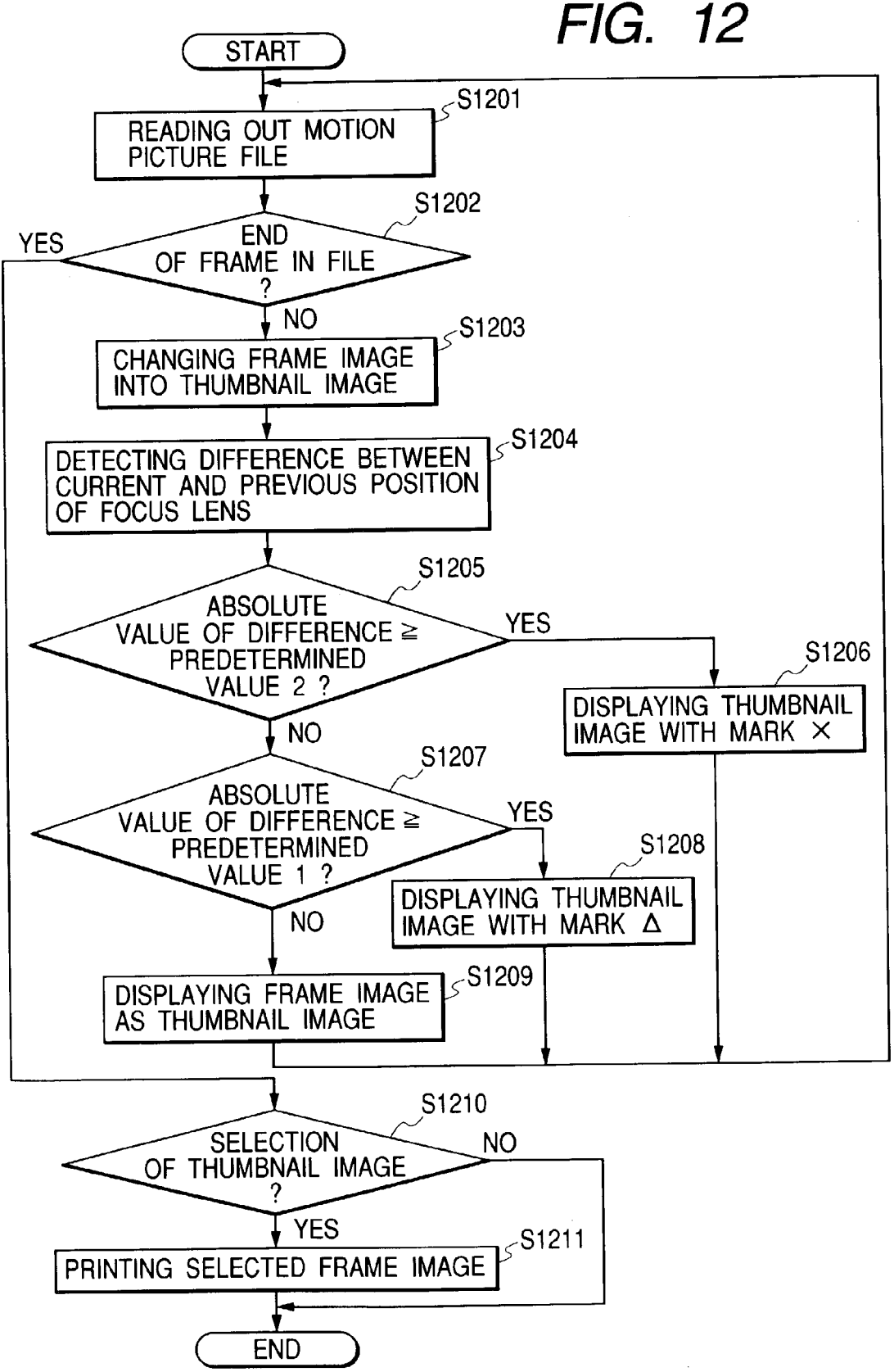
FIG. 12 is a flowchart showing an example of the operation of the printing apparatus in the second embodiment.

FIG. 12 is a flowchart showing the operation of the printing apparatus 200 in this embodiment.

Processing in steps S1201 to S1203 is the same as that in steps S901 to S903 in FIG. 9 and therefore the description thereof is omitted in this embodiment.

In step S1204, a difference between the focus lens position of a previous frame and the focus lens position of a current frame is detected. Next, in step S1205, it is checked whether the absolute value of the difference is equal to or greater than a predetermined value 2. The value of this predetermined value 2 is not specifically limited, although this value is set at 70%, for instance. In this case, the focus lens is speedily driven, which corresponds to a state in the first embodiment where the focusing speed is equal to or more than STEP-3.

Therefore, in the case where the absolute value of the difference is greater than the predetermined value 2, in order to call user's attention, the character 805 shown in FIG. 8 is superimposed and displayed on a corresponding thumbnail image (step S1206).

Also, in the case where the absolute value of the difference is less than the predetermined value 2, the processing proceeds to step S1207, in which it is checked whether the absolute value of the difference is greater than a predetermined value 1. The value of this predetermined value 1 is not specifically limited, although this value is set at 30%, for instance. In this case, the focus lens is relatively speedily driven, which corresponds to a state in the first embodiment where the focusing speed is equal to or more than STEP-2.

Therefore, in order to call user's attention, the character 806 shown in FIG. 8 is superimposed and displayed on the corresponding thumbnail image (step S1208).

Also, in the case where the results of the judgments in steps S1205 and S1207 are both negative, only the thumbnail image is displayed as it is (step S1209).

Thumbnail images are displayed in succession on the display unit 704 by repeating the processing described above. In the case where the number of thumbnail images exceeds the number of images that can be displayed on the same screen, the thumbnails exceeding the displayable number are held in a memory within the frame selection unit 702 and, when the scroll bar 803 is operated, corresponding thumbnail images are read from the memory and are displayed.

After the thumbnail images are displayed, in the case where it is judged that a thumbnail image is selected in step S1210, image data of a corresponding frame is outputted to the printing unit 705 to perform printing of the selected frame image in step S1211.

As has been described above, in this embodiment, the focus information showing the position of the focus lens is added to each frame of an image signal and is recorded, the focus information is detected from a reproduced motion picture signal, and the degree of blurring is calculated based on differences between focus lens positions and is displayed. As a result, it becomes possible to use the blurring degree as a guideline of user's selection of an image to be printed.

Next, there will be described a third embodiment of the present invention.

In the first and second embodiments, a frame that has been directly designated by the user is printed. In this embodiment, however, a plurality of frames contained in a section of a motion picture designated by the user are successively printed.

The construction of an image processing system in this embodiment is the same as that in the first embodiment shown in FIG. 1 and the construction of the image pickup apparatus 100 is also the same as that in FIG. 2. Therefore, the description thereof is omitted in this embodiment.

It does not matter whether the focus information in this embodiment is the control information in the first embodiment that shows the moving speed and direction of the focus lens or the information in the second embodiment that shows the position of the focus lens. In this embodiment, however, it is assumed that the focus information is the same focus lens control information as in the first embodiment. Accordingly, the processing procedure for controlling the focus lens, the format of recording of the focus information, and the processing for recording the focus information by adding the focus information to a motion picture signal are the same as those in the first embodiment. Therefore, the description thereof is omitted in this embodiment.

Next, there will be described how the printing apparatus 200 that processes a motion picture signal, to which the focus information has been added in this manner, operates.

The control construction of the printing apparatus 200 is the same as that in FIG. 6, so that the description thereof is omitted in this embodiment.

Figure 13:
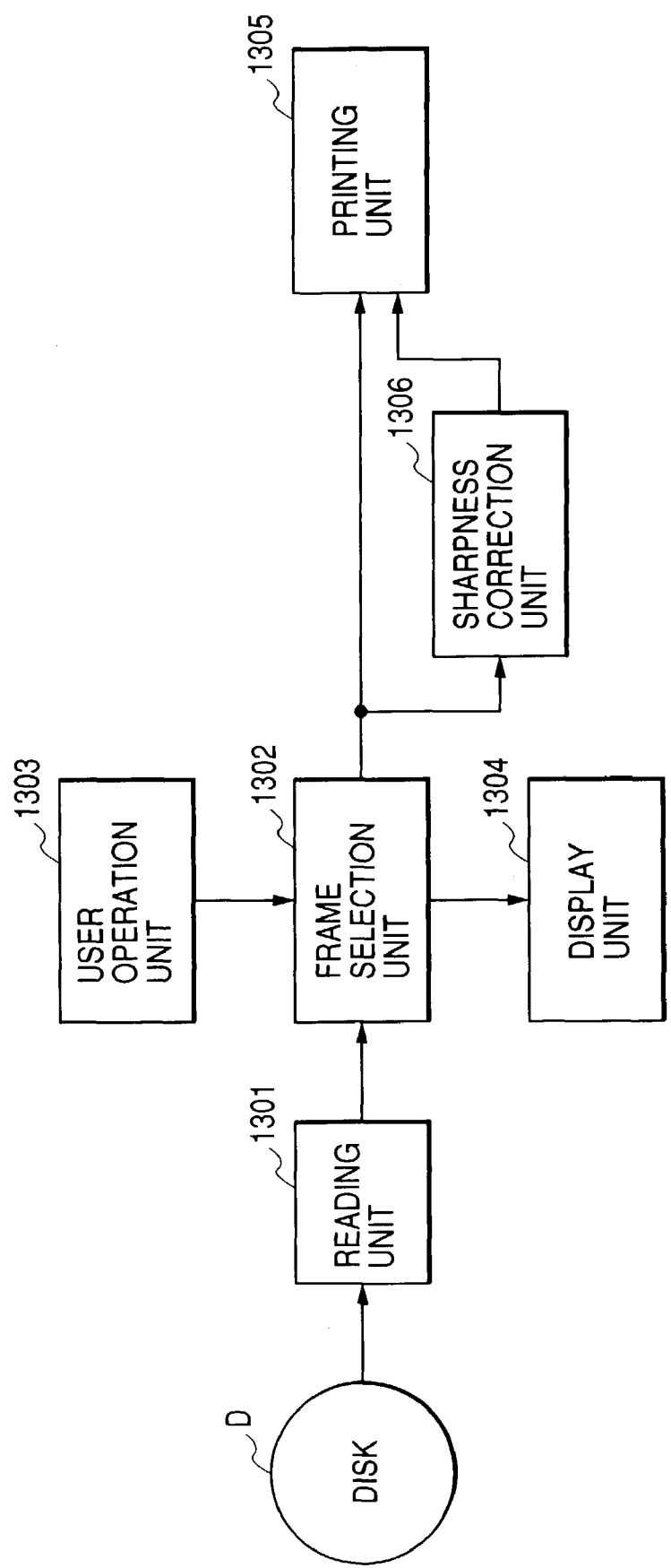
FIG. 13 shows the functional construction of a printing apparatus in the third embodiment.

FIG. 13 is a block diagram showing the functional construction of the printing apparatus 200 in this embodiment.

In FIG. 13, reference numeral 1301 denotes a reading unit that reads the motion picture signal recorded on the disk D in the aforementioned manner and the focus information added to this motion picture signal. Reference numeral 1302 represents a frame selection unit that determines a section of the motion picture that will be applied to printing. Reference numeral 1303 indicates a user operation unit that is constructed from the keyboard 604 and the mouse 605 and gives a section selection designation and other designations. Reference numeral 1304 denotes a display unit that displays a section that is a candidate for printing and the like. Reference numeral 1305 represents a printing unit that is constructed from the printing unit 609 and the like and prints images of frames in the section selected by the frame selection unit 1302. Reference numeral 1306 indicates a sharpness correction unit that in the case where frames whose images are blurred, exist in the selected section, corrects the sharpness of the images of the frames.

Figure 14:
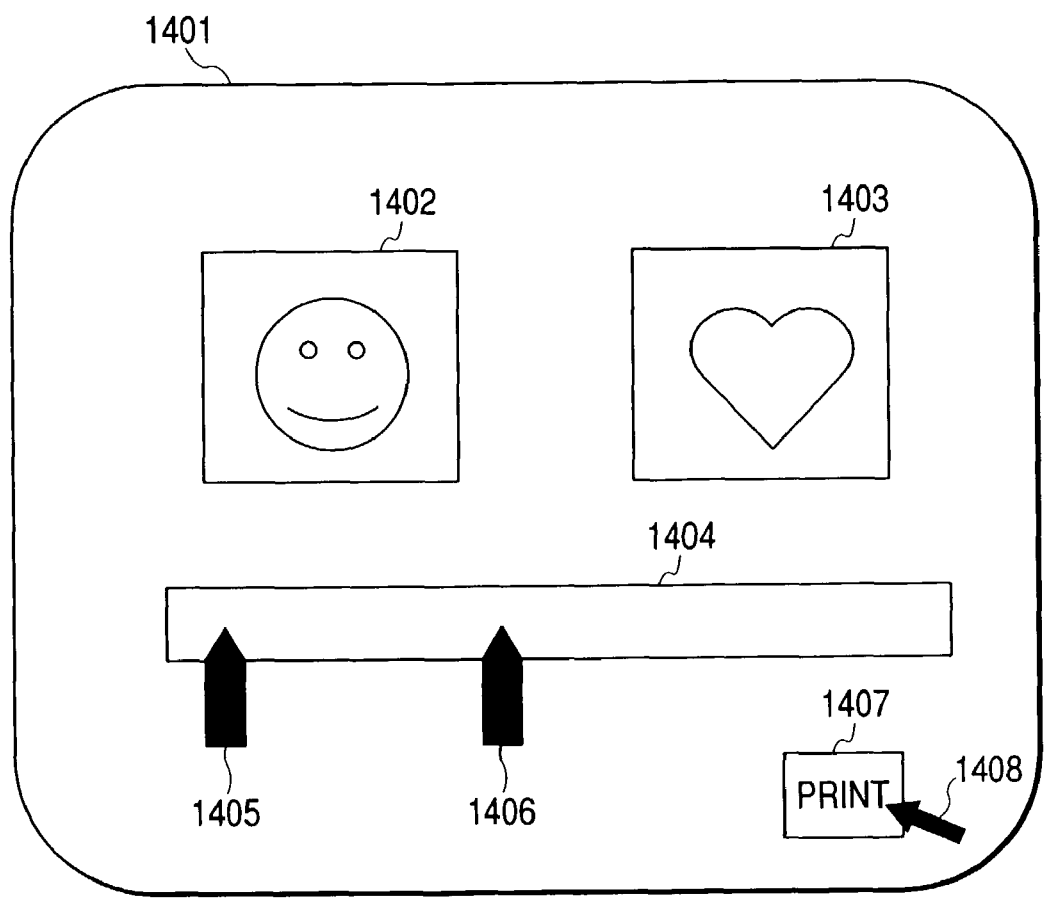
FIG. 14 shows a state of a display screen in the third embodiment.

FIG. 14 shows an example of a user interface that uses the display screen of the display unit 1304.

In FIG. 14, reference numeral 1401 denotes a display area, while reference numerals 1402 and 1403 respectively represent thumbnail display areas for confirming start position and end position, in which areas there are displayed thumbnails of frames at the start position and end position (to be described later) of the designated section of the motion picture. Reference numeral 1404 indicates a bar representing the entirety of a motion picture file. Reference numerals 1405 and 1406 respectively denote a start position designation pointer and an end position designation pointer that are used to specify a section to be applied to printing of the motion picture. Reference numeral 1407 denotes a print start button that is a button for designating start of print. Reference numeral 1408 represents a pointer that is moved by a user through the user operation unit 1303, thereby allowing the user to operate the start position designation pointer 1405, the end position designation pointer 1406, the print start button 1407, and the like to give various instructions.

Figure 15:
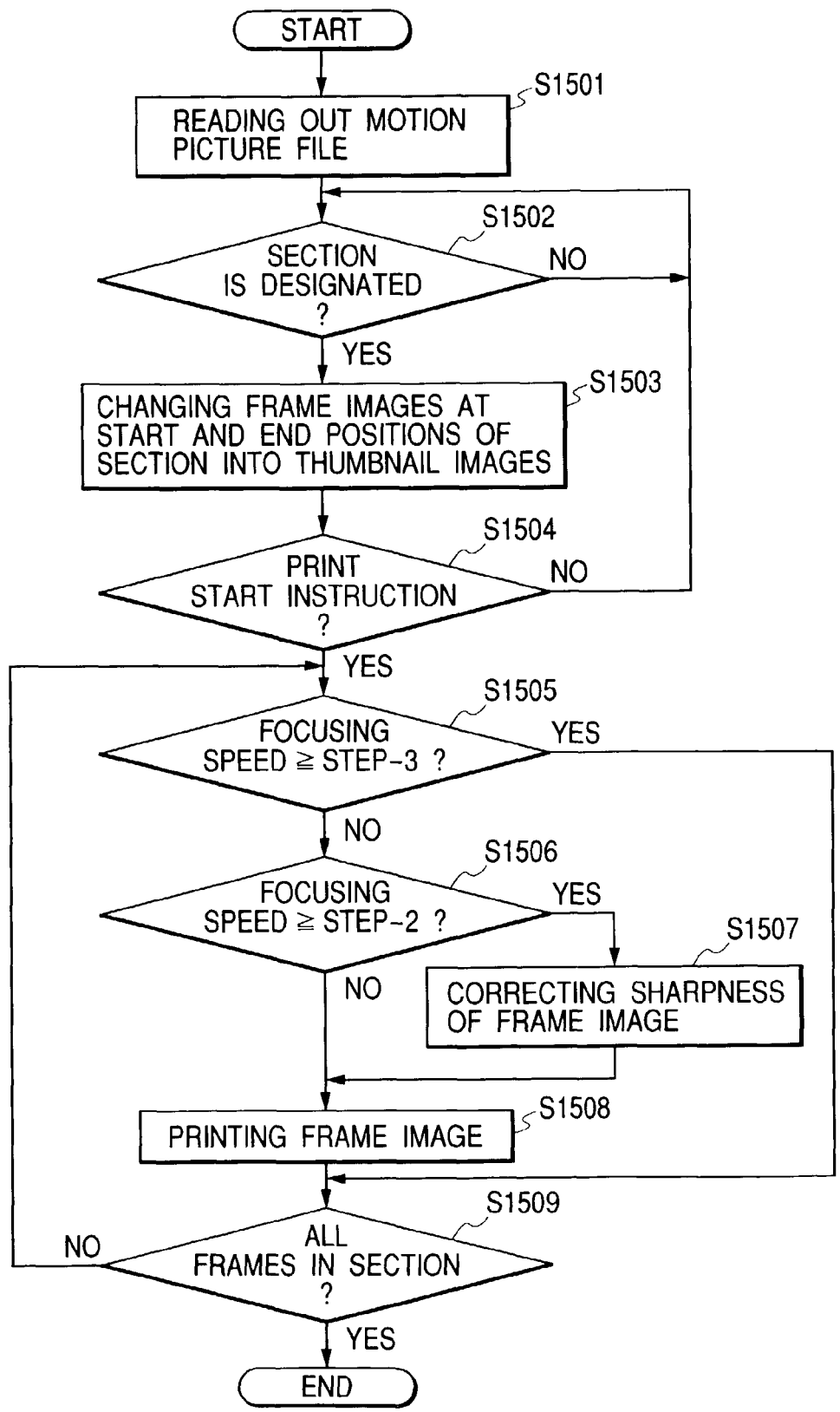
FIG. 15 is a flowchart showing an example of the operation of the printing apparatus in the third embodiment.

FIG. 15 is a flowchart showing an example of the operation of the printing apparatus 200.

First, the reading unit 1301 reproduces motion picture data designated by the user through the user operation unit 1303, from the disk D and outputs the read data to the frame selection unit 1302 (step S1501). Next, the frame selection unit 1302 judges whether a section of the motion picture that should be printed is designated using the start position and end position designation pointers 1405 and 1406 through the user operation unit 1303 (step S1502). If a result of this judgment is negative, the processing returns to step S1502. That is, the printing apparatus 200 is placed in a standby state until a section is designated.

If the judgment result is affirmative, image data of frames at the start position and the end position of the section is decoded, is reduced to an appropriate size at which it is possible to display the data in the start position and end position of thumbnail display areas 1402 and 1403, and is displayed as thumbnail images on the display unit 1304 (step S1503).

Next, it is judged whether the print start button 1408 is depressed (step S1504). If a result of this judgment is negative, this means that no print instruction is issued and there is a possibility that the section setting will be made again, so that the processing returns to step S1502. If the judgment result is affirmative, this means that a print instruction is issued. Therefore, the processing proceeds to processing (steps S1505 to step S1509) in which frame images are printed while checking the focusing speed information of the focus information added to each frame in the designated section.

First, it is judged whether the focusing speed is more than STEP-3 (step S1505) and, if a result of this judgment is affirmative, it is judged that a corresponding image is greatly blurred and is not suited for printing. Therefore, printing of the image is not performed and the processing proceeds to step S1509 in which it is judged whether all frames in the section have been processed.

Next, it is judged whether the focusing speed is more than STEP-2 (step S1506) and, if a result of this judgment is affirmative, the degree of blurring of the corresponding image is small and it is judged that this image is relatively unsuited for printing if no processing is performed on the image. Therefore, the frame selection unit 1302 outputs the image data of this frame to the sharpness correction unit 1306 and the sharpness of this image is corrected by the sharpness correction unit 1306, thereby processing the image data into an image suited for printing (step S1507).

Here, an example of a concrete means for changing the sharpness will be described.

It is possible to use a method with which a spatial secondary differential value of a density distribution in proximity to each pixel in an image is multiplied by a predetermined coefficient, a result of this multiplication is added to the density value of the pixel, and a result of this addition is set as a new density value of the pixel (hereinafter this method will be referred to as the "secondary differentiation and addition processing"). During the secondary differentiation and addition processing, if a value of the predetermined coefficient, by which the secondary differential value is multiplied, is set at a negative great value, the effectiveness of the sharpness correction is strengthened and the image is sharpened. On the other hand, if the value of the predetermined coefficient is set at a positive great value, the effectiveness of the sharpness correction is weakened and the image becomes out of focus. Therefore, in this embodiment, the coefficient is set at a negative great value. Needless to say, the effectiveness of this processing is limited. In the case of an image whose blurring degree is small, however, it is possible to enhance the sharpness of the image to a level that is sufficient for printing.

Next, the frame image that has been subjected to the sharpness correction is outputted to the printing unit 1305, which then prints the frame image (step S1508).

Also, in the case where the results of the judgments in steps S1505 and S1506 are both negative, the frame image is outputted to the printing unit 1505 as it is and is printed (step S1508).

Next, it is judged whether all frames in the selected section have been subjected to the processing in steps S1505 to S1508, that is, it is judged whether all frames in the section have been processed (step S1509). If a result of this judgment is negative, steps S1505 to S1508 are repeated. If all frames in the section have been processed, the processing is ended.

As has been described above, in accordance with this embodiment, blurring of an image and the degree of the blurring are detected on the basis of the focus information added to each frame in a selected section of a motion picture signal. If the blurring degree is at a level at which correction thereof is possible, the correction is carried out and printing is performed. On the other hand, if the blurring degree is at a level at which correction thereof is impossible, the printing is not performed. As a result, it becomes possible for the user to automatically obtain only sharp frame images from a designated section as a print result.

In the first and second embodiments described above, the degree of blurring is expressed with two steps. Needless to say, however, it is possible to express the blurring degree with more steps. In this case, in the first embodiment, the focusing speed is expressed and described with further smaller steps and the threshold value judgments (steps S904 and S906 in FIG. 9) are made with further smaller steps of threshold values. In the second embodiment, the threshold value judgments (steps S1205 and S1207 in FIG. 12) are made with further smaller steps of threshold values.

Also, in the third embodiment, the degree of blurring is expressed with two steps and there are only two kinds of processing; processing in which sharpness correction is performed, and processing in which printing is performed without carrying out the sharpness correction. Needless to say, however, it is possible to set more steps and to change the effectiveness of the sharpness correction in accordance with the set steps. In this case, the focusing speed is expressed and described with further smaller steps and the threshold value judgments (steps S1505 and S1506 in FIG. 15) are made with further smaller steps of threshold values.

Figures 16, 17:
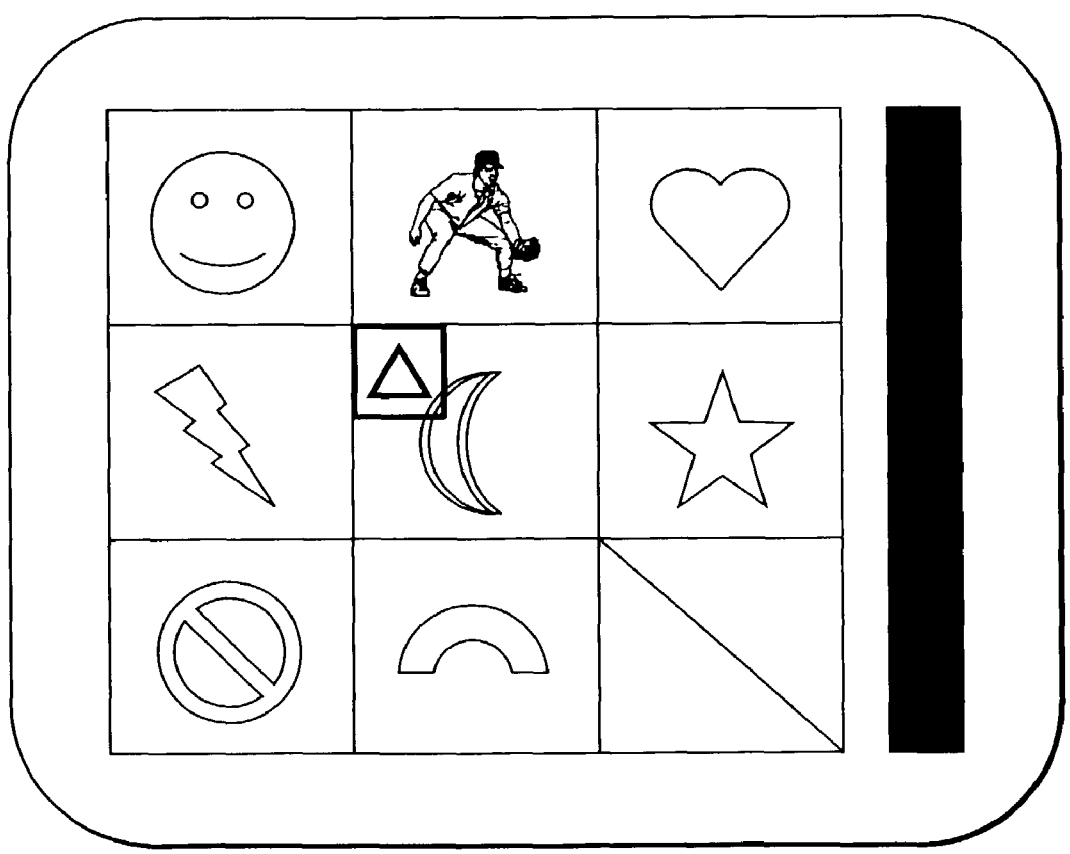
FIG. 16 shows focus information.
FIG. 17 shows a screen in which thumbnails are displayed.

Also, in the first and second embodiments, the degree of blurring is expressed with two steps. Needless to say, however, if a simple construction is sufficient in which only the existence of shaking is recognized, it is possible to express the blurring degree so that such a construction is realized. In this case, the number of threshold value judgments (values in steps S904 and S906 in FIG. 9 and values in steps S1204 and S1206 in FIG. 12) is reduced to one. Also, in the first embodiment, there occurs no problem even if only a bit showing in-focus/defocus is described as the focus information, as shown in FIG. 16.

Also, in the third embodiment, the degree of blurring is expressed with two steps. Needless to say, however, if a simple construction is sufficient in which printing is not performed in the case where there exists shaking, it is possible to realize such a construction. In this case, the number of threshold value judgments (values in steps S1505 and S1506 in FIG. 15) is reduced to one. Also, there occurs no problem even if only a bit showing in-focus/defocus is described as the focus information, as shown in FIG. 16.

Also, the focus information is given for each frame in the first to third embodiments, although it is enough that the focus information is stored in a form in which it is possible to find correspondences with the frames. For instance, it is possible to use a method with which the focus information is collectively stored for each section in a footer of a motion picture file or the like. Note that the start position and the end position are not specifically limited so long as it is possible to maintain correspondences with the frames. For instance, it is possible to use time information or frame IDs.

Also, in the first to third embodiments, motion picture data is encoded in accordance with an MPEG system. Needless to say, however, the present invention is not limited to this and the focus information may be encoded in accordance with another system so long as it is possible to store the focus information in a form in which correspondences with frames are maintained.

Also, in the first embodiment, the moving speed and direction of the focus lens are recorded as the focus information. In the second embodiment, the position of the focus lens is recorded as the focus information. Needless to say, however, both of them may be described.

Also, in the first and second embodiments, there is adopted a system in which there is called user's attention by superimposing a character image on each thumbnail image whose image is blurred, as shown in FIG. 8. However, there may be used a system in which each image that is supposed to be greatly blurred is not displayed and only each image with a small blurring degree is displayed, as shown in FIG. 17.

Figure 18:
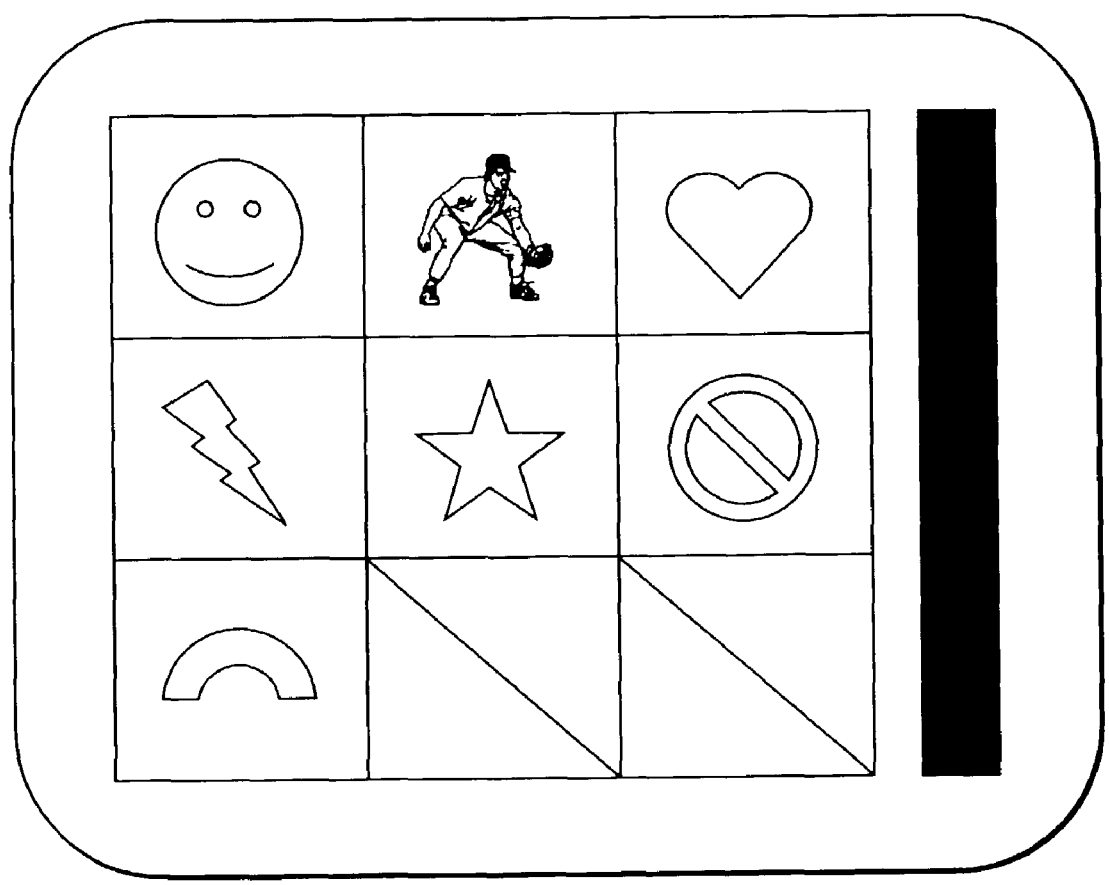
FIG. 18 shows a screen in which thumbnails are displayed.

Also, it is possible to perform step-by-step display by providing three modes that are the mode shown in FIG. 8 in which all of thumbnails are displayed, the mode shown in FIG. 18 in which only images that are not blurred are displayed, and the mode shown in FIG. 17 in which displaying is performed by deleting images that are greatly blurred.

Also, in the embodiments described above, there has been explained an example in which the focus information is used in the printing apparatus. However, it is possible to use the focus information in various apparatuses such as an editing apparatus, a reproduction apparatus, and a retrieval apparatus. Even in these usage forms, it becomes possible to perform various processings such as processing (1) in which there is called user's attention to frames in which images are blurred, processing (2) in which frames, whose images are blurred, are removed from targets for usage, and processing (3) in which displaying, correction, or other processing is performed in a step-by-step manner in accordance with the blurring degrees of images.

Figure 19:
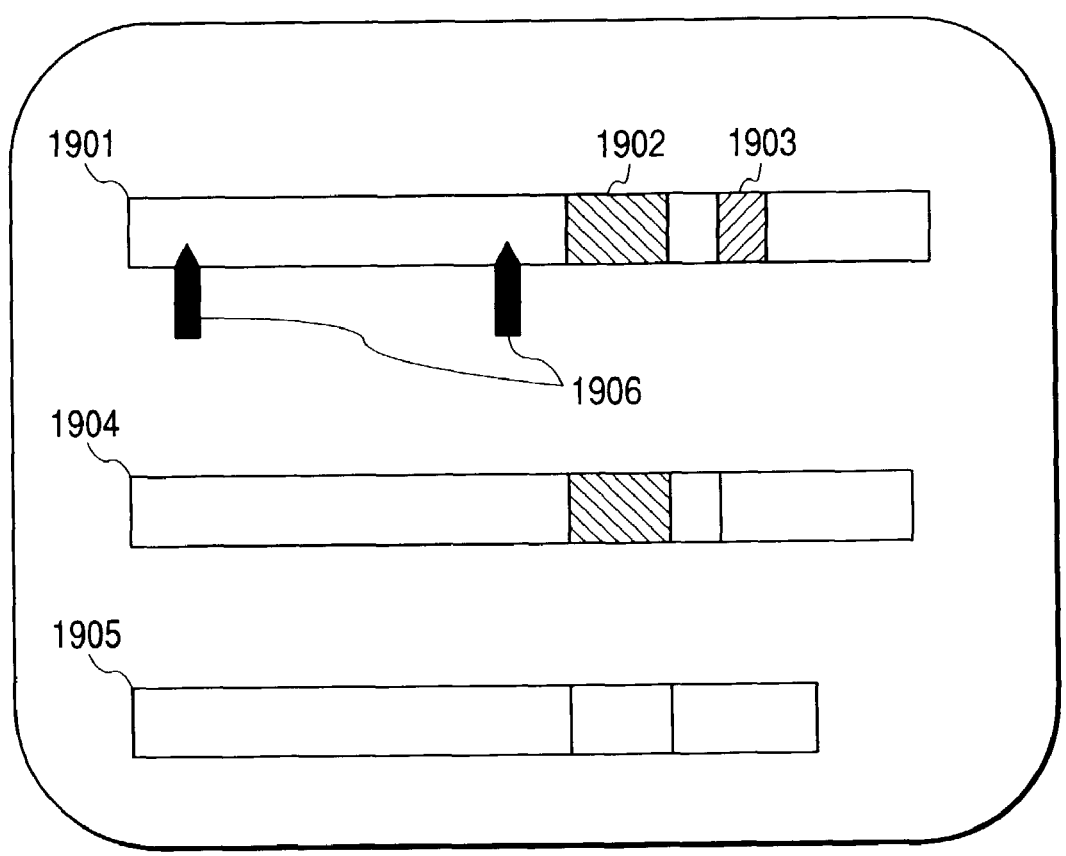
FIG. 19 shows an editing screen.

In such a case where the focus information is used in a motion picture editing apparatus, for instance, it is possible to have this apparatus display a screen shown in FIG. 19. In FIG. 19, reference numeral 1901 denotes a bar expressing the whole of a motion picture file, while reference numeral 1906 represents a position designation pointer that is used to designate a section to be subjected to editing. Reference numeral 1902 indicates a section of the motion picture 1901 having a small blurring degree, while reference numeral 1903 denotes a section having a large blurring degree.

In this case, for instance, it becomes possible for a user to perform editing while avoiding each section in which images are blurred, using the displayed contents in FIG. 19 as a guideline (or to automatically perform sharpness correction on each section having a small blurring degree and then to perform editing). As indicated by reference numeral 1905, it is also possible to perform displaying while eliminating the sections 1902 and 1903 in which images are blurred. In addition, it is possible to prevent the user from selecting these sections. Also, in response to a user's instruction, it is possible to perform step-by-step displaying in which, for instance, all frames are first displayed as indicated by reference numeral 1901, displaying is then performed in the manner indicated by reference numeral 1904 in which only a portion 1903 having a large blurring degree is eliminated, and displaying is finally performed in the manner indicated by reference numeral 1905 in which all portions, in which blurring occurs, are eliminated.

Also, in the second embodiment, there is used a difference between a current focus lens position and a previous focus lens position. However, the present invention is not limited to this and it is sufficient that it is possible to calculate an amount corresponding to a focusing speed. For instance, there may be used three or more lens positions.

Also, the first to third embodiments are each constructed from two apparatuses that are an image pickup apparatus that gives the focus information and a printing apparatus that uses the focus information. However, the construction may be changed so that these embodiments are realized with a single apparatus. That is, it is possible to confirm the blurring degree of a motion picture in the image pickup apparatus 100 by giving the reproduction function, the function of judging the degree of in-focus, the displaying function, and the like of the printing apparatus 200 to the image pickup apparatus 100.

Also, the focus information is transmitted and received through the disk D, although the construction may be changed so that these transmission and reception are performed using a communication means pursuant to the IEEE1394 standard or the like.

Also, the objects of the present invention are attained even if a storage medium, in which there is stored a program code of software for realizing the functions described in the aforementioned embodiments, is supplied to a system or an apparatus and a computer (CPU or MPU) of the system or apparatus reads and executes the program code stored in the storage medium.

In this case, the program code itself read from the storage medium realizes the functions in the embodiment described above, which means that the storage medium storing the program code constitutes the present invention.

As the storage medium for supplying the program code, it is possible to use a floppy disk, a hard disk, an optical disk, a magneto-optical disk, a CD-ROM, a CD-R, a magnetic tape, a nonvolatile memory card, a ROM, or the like, for instance.

Also, in addition to a case where the functions described in the aforementioned embodiments are realized by the execution of the program code read by the computer, the present invention includes a case where an OS (operating system) or the like running on the computer performs all or a part of actual processing based on instructions of the program code and the functions in the embodiments described above are realized by such processing.

Further, the present invention includes a case where the program code read from the storage medium is written in a memory provided on a function expansion board inserted into a computer or a function expansion unit connected to the computer, a CPU or the like of the function expansion board or the function expansion unit performs all or a part of actual processing based on instructions of the program code, and the functions in the embodiments described above are realized by such processing.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image processing apparatus comprising:
a reproduction unit which reproduces from a recording medium a motion picture signal that is obtained and recorded on the recording medium by an image pickup device, and operating information including a photographing operation parameter including a driving direction of a focus lens of the image pickup device, wherein the operating information is different from the motion picture signal and is recorded on the recording medium in addition to the motion picture signal by the image pickup device;
an operation unit that provides a reproduction instruction for reproducing the motion picture signal from the recording medium, wherein the reproduction unit reproduces the motion picture signal and the operating information from the recording medium responsive to the reproduction instruction provided by the operation unit;
a display unit which, responsive to the reproduction instruction provided by the operation unit, generates a plurality of thumbnail images by reducing, respectively, a plurality of pictures included in the motion picture signal reproduced from the recording medium by said reproduction unit, and displays the plurality of generated thumbnail images of the plurality of pictures on a same screen of a display device;

a detection unit which, responsive to the reproduction instruction provided by the operation unit, detects an in-focus degree of a motion picture corresponding to each of the plurality of thumbnail images displayed on the display device, on the basis of the operating information reproduced from the recording medium by said reproduction unit;

a control unit which controls said display unit to display each of the plurality of thumbnail images on the same screen in such a manner that additional information indicating the in-focus degree is displayed on the same screen together with the corresponding thumbnail image, in accordance with a detection result by said detection unit; and a selection unit which selects one of the plurality of thumbnail images displayed on the display device.

2. An image processing apparatus according to claim 1, wherein the control unit controls the display unit so as to superimpose the additional information on the thumbnail image.

3. An image processing method comprising:

reproducing from a recording medium a motion picture signal that is obtained and recorded on the recording medium by an image pickup device, and operating information including a photographing operation parameter including a driving direction of a focus lens of the image pickup device, wherein the operating information is different from the motion picture signal and recorded on the recording medium in addition to the motion picture signal by the image pickup device;

providing, with an operation unit, a reproduction instruction for reproducing the motion picture signal from the recording medium, wherein the reproducing step reproduces the motion picture signal and the operating information from the recording medium responsive to the reproduction instruction provided with the operation unit;

generating, responsive to the reproduction instruction provided with the operation unit, a plurality of thumbnail images by reducing, respectively, a plurality of pictures included in the motion picture signal reproduced from the recording medium in said reproducing step, and displaying the plurality of generated thumbnail images of the plurality of pictures on a same screen of a display device;

detecting, responsive to the reproduction instruction provided by the operation unit, an in-focus degree of a motion picture corresponding to each of the plurality of thumbnail images displayed on the display device, on the basis of the operating information reproduced from the recording medium in said reproducing step;

controlling the display of each of the plurality of thumbnail images on the same screen in such a manner that additional information indicating the in-focus degree is displayed on the same screen together with the corresponding thumbnail image, in accordance with a detection result in said detecting step; and selecting one of the plurality of thumbnail images displayed on the display device.

4. An image processing apparatus comprising:

a reproduction unit which reproduces from a recording medium a motion picture signal that is obtained and recorded on the recording medium by an image pickup device, and operating information including a photographing operation parameter including a driving direction of a focus lens of the image pickup device, wherein the operating information is different from the motion picture signal and is recorded on the recording medium in addition to the motion picture signal by the image pickup device;

an operation unit that provides a reproduction instruction for reproducing the motion picture signal from the recording medium, wherein the reproduction unit reproduces the motion picture signal and the operating information from the recording medium responsive to the reproduction instruction provided by the operation unit;

a display unit which, responsive to the reproduction instruction provided by the operation unit, generates a plurality of thumbnail images by reducing, respectively, a plurality of pictures included in the motion picture signal reproduced from the recording medium by said reproduction unit, and displays the plurality of generated thumbnail images of the plurality of pictures on a same screen of a display device;

a detection unit which, responsive to the reproduction instruction provided by the operation unit, detects whether each of the plurality of pictures of the motion picture signal corresponding to the plurality of thumbnail images displayed on the display device is suitable for printing, on the basis of the operating information reproduced from the recording medium by said reproduction unit;

a control unit which controls said display unit to display each of the plurality of thumbnail images on the same screen in such a manner that additional information indicating whether the picture corresponding to the thumbnail image displayed on the display device is suitable for printing is displayed on the same screen together with the corresponding thumbnail image, in accordance with a detection result by said detection unit; and a selection unit which selects one of the plurality of thumbnail images displayed on the display device.

5. An image processing apparatus according to claim 4, further comprising:

an output unit which outputs the picture corresponding to the selected thumbnail image to a printing device.

6. An image processing apparatus according to claim 4, wherein the control unit controls the display unit so as to superimpose the additional information on the thumbnail image.

7. A non-transitory computer-readable storage medium which retrievably stores a program comprising program code for causing a computer to function as the respective units of the image processing apparatus recited in claim 1.

8. A non-transitory computer-readable storage medium which retrievably stores a program comprising program code for causing a computer to function as the respective units of the image processing apparatus recited in claim 4.

* * * * *